United States Patent

Avila

[15] 3,665,611
[45] May 30, 1972

[54] MULTI-SCALE DRAWING INSTRUMENT

[72] Inventor: Oscar R. Avila, 98-25 64th Road, Forest Hills, N.Y. 11374

[22] Filed: Feb. 5, 1970

[21] Appl. No.: 8,828

[52] U.S. Cl. ..........................................33/148 R, 33/172 B
[51] Int. Cl. ......................................G01b 5/00, G01b 3/22
[58] Field of Search......................33/147, 166, 148, 172; 116/124.5, 135

[56] References Cited

UNITED STATES PATENTS

| | | | |
|---|---|---|---|
| 1,299,179 | 4/1919 | Harcos | 33/148 |
| 2,958,136 | 11/1960 | Anderson | 33/166 |
| 1,317,708 | 10/1919 | Kaplan | 33/148 |

*Primary Examiner*—Leonard Forman
*Assistant Examiner*—A. J. Mirabito
*Attorney*—Eugene E. Geoffrey, Jr.

[57] ABSTRACT

A multi-scale drawing instrument and more specifically dividers having a housing with a pair of elongated pointed members extending therefrom with the members movable one relative to the other, a movable strip of material within the housing and observable through a window therein, the strip being coupled to the members so that it will move relative to a center line an amount proportional to the angle between the members. The strip is provided with a plurality of sets of scales to provide among other measurements a direct reading of the distance between the two points on a scaled drawing when the ends of said members are positioned on said points.

1 Claim, 7 Drawing Figures

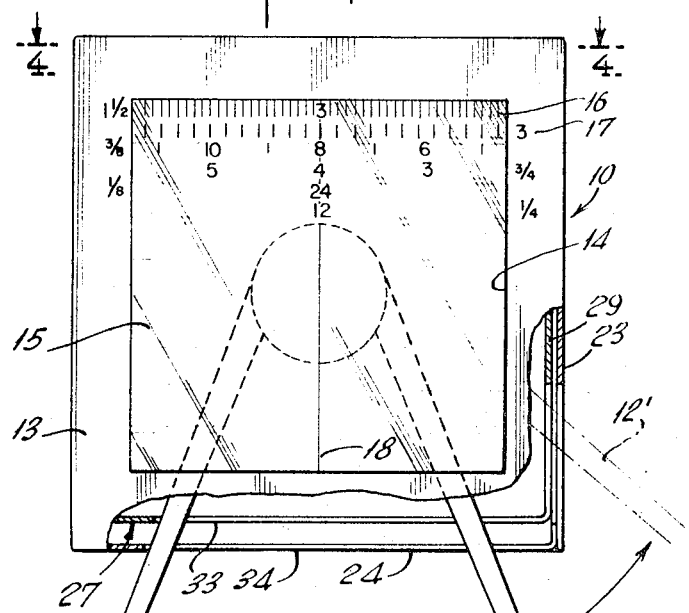
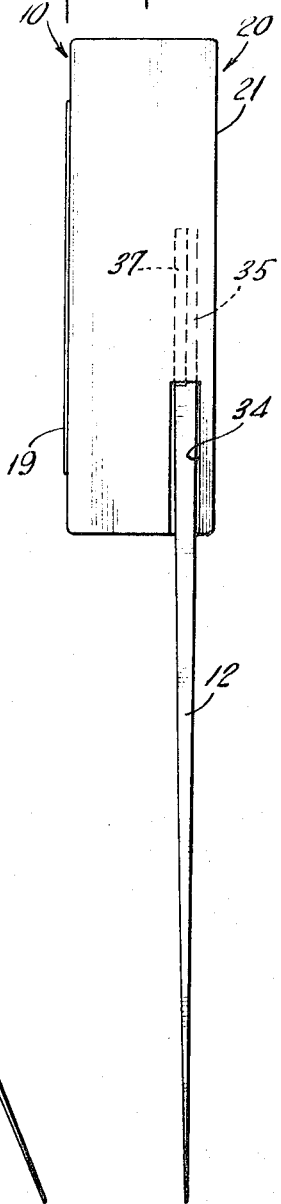
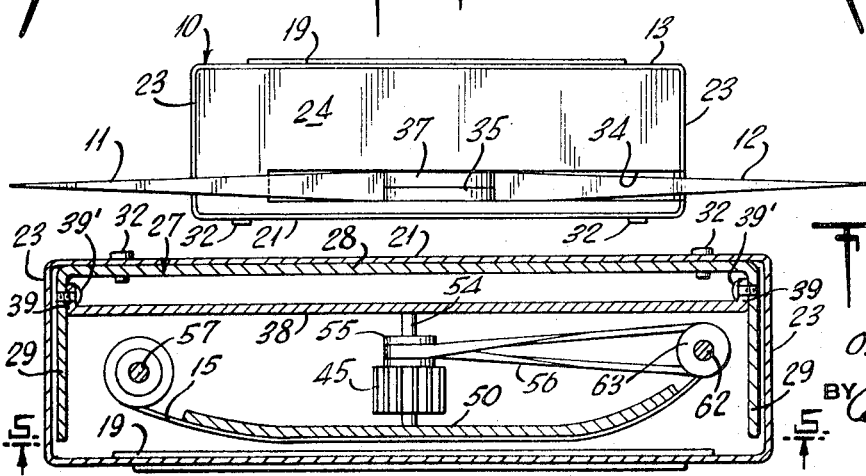

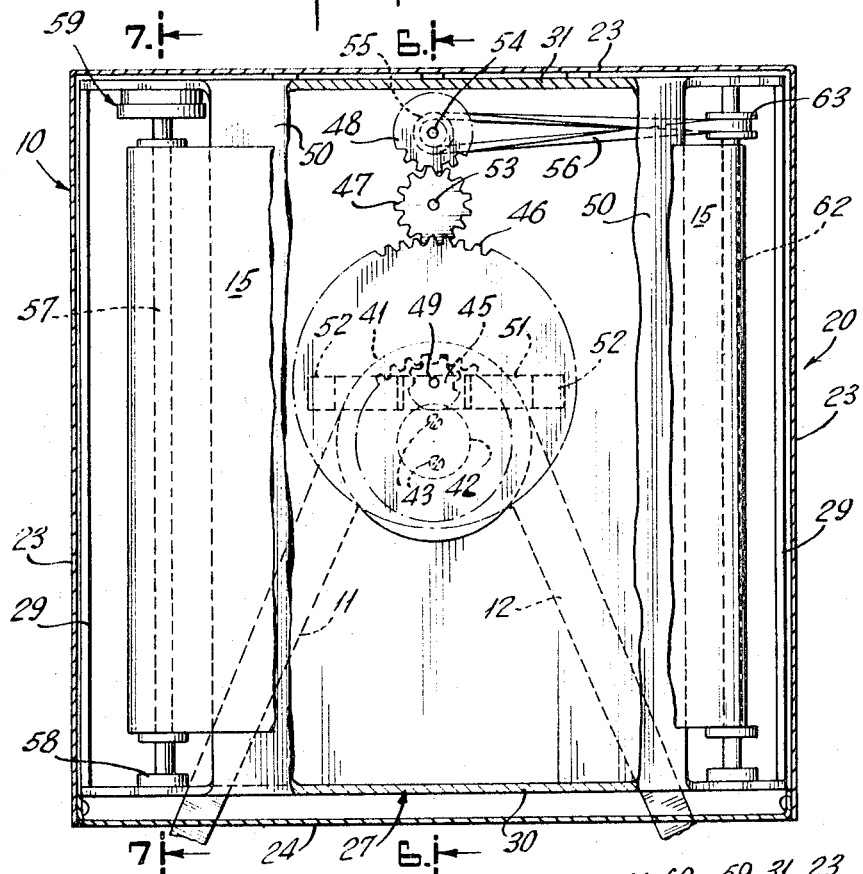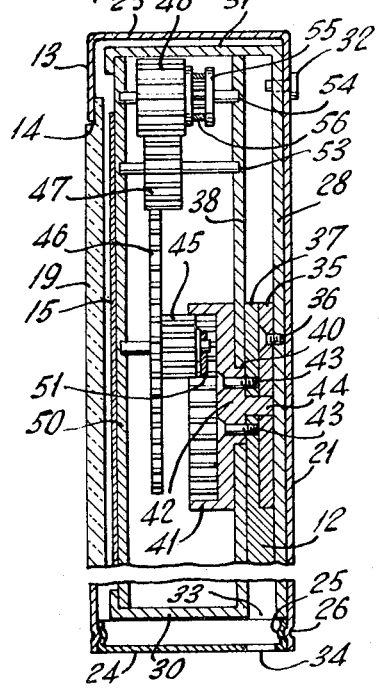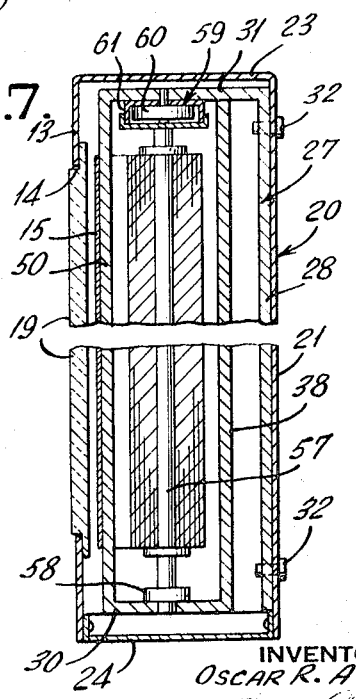

MULTI-SCALE DRAWING INSTRUMENT

This invention relates to a drawing instrument of the type used in architects and engineers and more specifically to a novel and improved divider having a plurality of scales to afford the user a direct reading of the distance between the ends of the elongated members or legs of the divider in terms of a selected scale.

Dividers generally comprise two elongated members pivoted one to the other and are used for measuring distances between points on a drawing. An appropriate engineer's or architect's scale is normally used with the divider in order to set the angular position of the legs in accordance with a specific scale when making or checking drawings. Prior known devices have embodied concentric circular scales rotated by movement of the legs of the divider but have not been found entirely satisfactory and present difficulties in accurately setting the drawing instrument. This invention overcomes the difficulties heretofore encountered and provides a novel and improved divider wherein the scales may be easily and quickly read with little or no chance of error and at the same time affords a high degree of accuracy.

Another object of the invention resides in the provision of a novel and improved divider having a scale arrangement movable in a plane and wherein the material carrying the scale or scales as the case may be is maintained under substantially uniform tension which therefore affords a high degree of precision.

Still another object of the invention resides in the novel and improved drawing instrument or divider which is characterized by its ease of manufacture and simplicity of operation and greatly increased speed with which an architect or engineer may prepare or check a drawing.

The above and other objects and advantages of the invention will become more apparent from the following description and accompanying drawings forming part of this application.

In the drawings:

FIG. 1 is a side elevational view of a drawing instrument or divider in accordance with the invention;

FIG. 2 is a side elevational view of the structure shown in FIG. 1;

FIG. 3 is a bottom view of the structure shown in FIG. 1;

FIG. 4 is a cross-sectional view of FIG. 1 taken along the line 4—4 thereof;

FIG. 5 is a cross-sectional view of FIG. 4 taken along the line 5—5 thereof;

FIG. 6 is a cross-sectional view of FIG. 5 taken along the line 6—6 thereof; and FIG. 7 is a cross-sectional view of FIG. 5 taken along the line 7—7 thereof.

Referring now to the drawings, the drawing instrument or dividers includes a square or rectangular housing 10 having a pair of elongated legs or pointers 11 and 12 extending downwardly therefrom. The housing 10 includes a front wall 13 having a window 14 therein through which a strip of flexible material 15 may be observed. The movable strip 15 is provided with a plurality of sets of graduations 16 and 17, etc., representing different scales as for instance those used by architects and engineers. A vertical marker 18 such as a thin strand of wire is carried centrally of the window and acts as an indicator to provide an exact reading of any selected scale. If desired, the window is preferably closed by a suitable piece of transparent material 19 to prevent dirt and other foreign matter from entering the housing 10 and at the same time protect the movable strip 15 from damage.

In the instant embodiment of the invention, the housing 10 consists of an outer shell 20 having a rear wall 21, side and top walls 23 and a bottom wall 24 all of which may be made of metal, plastic, or other suitable material. The bottom wall 24 has an annular flange 25 having a longitudinal concavity which cooperates with a corresponding ridge 26 about the lower edges of the front, rear and side walls to hold the bottom wall in place. If desired, the bottom wall may also be cemented in position.

An inner housing 27 is disposed within the outer shell 20 and has a rear wall 28, side walls 29—29, a bottom wall 30 and a top wall 31. The inner housing 27 is secured within the outer shell 20 by screws 32 which extend through openings in the rear wall 21 of the shell 20 and threadably engage cooperating openings in the rear wall 28 of the inner housing. The inner housing 27 and the shell 20 have slots 33 and 34 which extend along a portion of the bottom walls of the inner housing 27 and the shell 20 as may be observed in FIG. 1 and upwardly along the side walls 29 and 23 to permit the leg 12 to be moved from a position adjoining the leg 11 to the broken line position 12' as shown in FIG. 1.

The leg 11 has a circular upper portion 35 as viewed more clearly in FIG. 6 which is secured to the rear wall 28 of the inner housing by a plurality of screws 36. The movable leg 12 has a similar circular portion 37 placed in overlying relationship with the circular portion 35 of the leg 11. An intermediate wall 38 positioned in spaced parallel relationship with the rear wall 28 is fastened in place by side flanges 39 and screws 39', the latter engaging cooperating openings in the side walls 29 of the inner housing.

The intermediate wall 38 has an annular opening 40 for rotatably receiving an internal toothed gear 41. More specifically the gear 41 has an annular portion 42 rotatably carried within the opening 40 and is fixedly secured to the circular portion 37 of the leg 12 by screws 43. To simplify assembly, the annular portion 42 may include a central pin 44 which engages a cooperating opening in the annular portion 35 of the leg 11 in order to ensure accurate alignment of the elements.

Movement of the leg 12 will effect rotation of the gear 41 and this motion is in turn transmitted to a gear train consisting of gears 45, 46, 47, and 48. The gears 45 and 46 are fixedly secured to the shaft 49 which is pivoted at one end to a front wall 50 of the inner housing 27, said front wall held in position by attachment to the upper and lower walls 31 and 30, respectively. The other end of the shaft 49 is carried by a bracket 51 which is formed to bridge the gear 41 and is secured at its ends 52 to the plate 38. The meshing gears 47 and 48 are carried by shafts 53 and 54 rotatably carried by the plates 38 and 50. A toothed pulley 55 is carried by the shaft 54 and engages a cooperating toothed belt 56 which, as will be shown, functions to drive the strip 15 carrying the plurality of scales.

The strip 15 is wound upon a shaft 57 which is pivoted at 58 to the bottom wall 30 of the inner housing. The upper end of the shaft 57 extends through a spring assembly generally denoted by the numeral 59 and pivotally engages the upper wall of the inner housing. The spring assembly 59 includes a spiral spring 60 connected at one end to the shaft 57 and at the other end to the annular housing portion 61 and is biased in a direction that will cause the shaft 57 to maintain constant tension on the strip 15. More specifically, the spring is biased so that the shaft 57 will tend to rotate in a clockwise direction as viewed in FIG. 4.

A second shaft 62 is pivotally supported at its upper and lower ends to the upper and lower walls 31 and 30 of the inner housing as will be observed more clearly in FIG. 5. The righthand edge of the strip 15 as viewed in FIG. 5 is secured to the shaft 62 and the latter carries a toothed pulley 63 which engages the belt 56. As will be observed more clearly in FIG. 4, the strip 15 is fed over the front wall 50 of the inner housing which wall is curved at its ends to provide a smooth path for movement and support of the strip.

With the apparatus as described above, as the leg 12 is moved to the right as viewed in FIG. 1, the gear train will be operated and it in turn will effect counterclockwise rotation of the shaft 62 as viewed in FIG. 4, and this action will cause the strip to move to the right. Since the scales 16, 17, etc., are coordinated with the movement of the leg 12, a direct scale reading is provided for any angular separation of the legs 11 and 12.

While only one embodiment of the invention has been illustrated and described, it is apparent that alternations, modifications and changes may be made without departing from the true scope and spirit thereof as defined by the appended claims.

What is claimed is:

1. A divider for making measurements comprising a housing, a pair of elongated legs carried by and extending from said housing, one of said legs being fixed to the housing and the other leg being movable relative to said one leg about a pivot within said housing, said housing having a window in one face thereof, an elongated strip of flexible material, a pair of cylindrical rollers rotatably supported within said housing at opposing edges of said window, said strip having its ends attached to said rollers and being wound upon at least one of said rollers for transport past said window, a plurality of measuring scales printed on said strip, mechanical driving means coupled to said movable leg and to at least one of said rollers whereby pivoting of said legs one relative to the other will effect proportional displacement of said scale relative to said window and indicating means fixed to said housing and coordinated with said scales on said strip to provide a direct scale reading corresponding to the measurement between the outer ends of said legs, said mechanical driving means including a gear train, a toothed pulley rotated by said train, a toothed pulley coupled to said one cylindrical roller, a toothed belt coupling said pulleys to effect transport of said strip and spring means coupled to said other cylindrical roller and operable to maintain tension on said strip upon movement of said other leg to transport said strip past the window.

* * * * *